Figure 1:
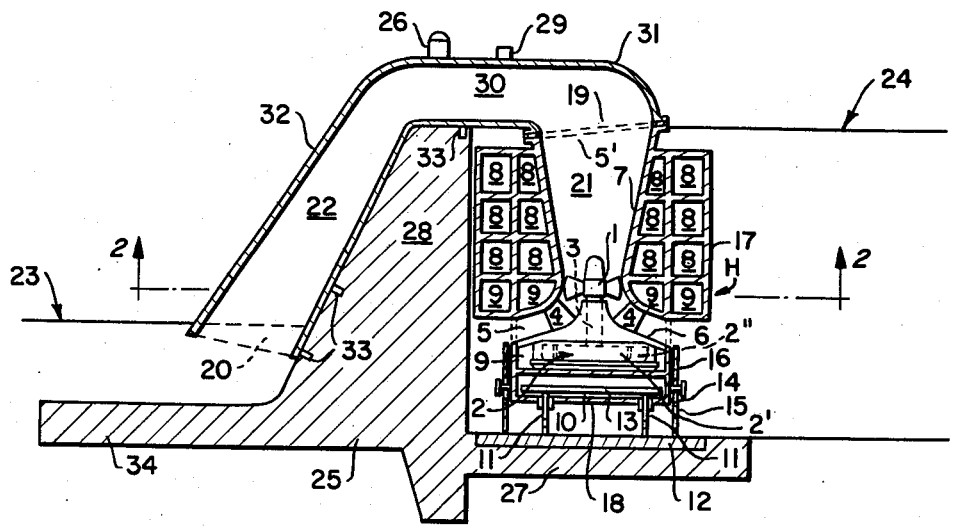
Figure 2:
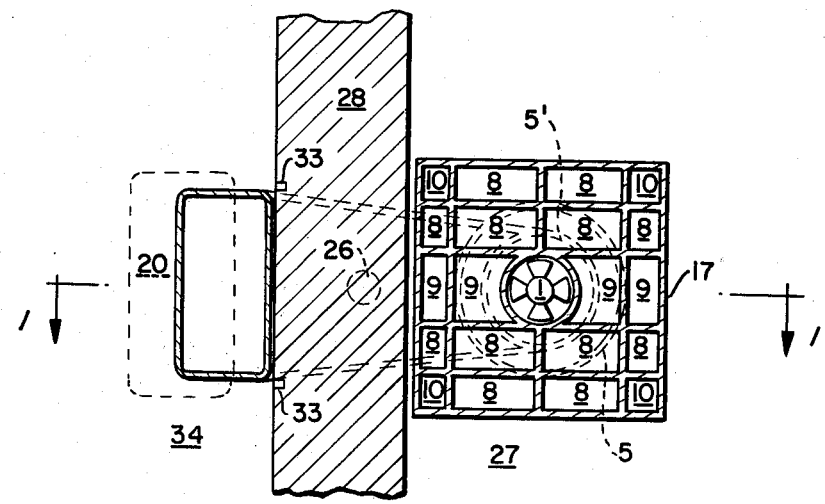

United States Patent [19]

Gutierrez Atencio

[11] 4,311,410
[45] Jan. 19, 1982

[54] SELF COMMANDED HYDROSTATION

[76] Inventor: Francisco J. Gutierrez Atencio, Estafeta Dr Garcia, Etre, Argentina

[21] Appl. No.: 102,822

[22] Filed: Dec. 10, 1979

[51] Int. Cl.³ ............................................. E02B 9/00
[52] U.S. Cl. ........................................... 405/78; 290/52
[58] Field of Search ...................... 405/75, 78; 290/52

[56] References Cited
U.S. PATENT DOCUMENTS

| 2,783,392 | 2/1957 | Corbiere | 405/78 X |
| 4,117,676 | 10/1978 | Atencio | 405/78 X |
| 4,207,015 | 6/1980 | Atencio | 405/78 |

Primary Examiner—Price C. Faw, Jr.
Assistant Examiner—Carl D. Friedman
Attorney, Agent, or Firm—Emory L. Groff, Jr.

[57] ABSTRACT

Self Commanded Hydrostation arrangement for a fluidic storing dam or gated engineered structure, includes a siphon layout conduit with a movable ascending branch having a hydromotive set and a fixed descending branch embodied with said damming structure inducing a fluidic flow therethrough said hydromotive set to produce actuation thereof. Said movable branch being relatively displaceable said fixed damming structure to stop or to start the hydromotive power generation set.

Movable gated means are alternatively included helping in both starting and stopping procedures sequences.

10 Claims, 4 Drawing Figures

SELF COMMANDED HYDROSTATION

This Patent application relates with small powered hydroelectric developments expected to be realized on low head existing dams, or gated structures; including in navigable waterways.

Economics matters, and administrative procedures have precluded the massive development of small hydro potentials within United States; this invention, however, should appeal to Utilities in that it minimizes installed costs, acceptance procedures, and delays because of civil engineered works.

Generally, it is recognized that the lower the hydraulic head, the more expensive the equipment it is; and, particularly, cost effectiveness has not been realized up today for hydraulic heads between 1.5 meters (5') and 5 meters (16.5'), despite availables potentials.

When examining the makeups and breakdown of hydroelectric projects costs, for small hydro (less than: 15.000 kW. per plant) and for conventional hydro (more than: 100.000 kW. per plant), we see that: For small hydro, costs splitting are as follows: (1) Equipment: 55% (2) Civil Engineering: 30% (3) Design: 15%.

For conventional hydro, instead, are as follows: (1) Equipment: 15% (2) Civil Engineering: 80% (3) Design: 5%.

It is seen that in conventional hydro the most important portion of the project costs relates with the Civil Engineered works (80%), while equipments deals only with a mere: 15%.

This is not the case in small hydro developments, wherein, equipments represents a much larger portion of installed costs (55% to 65%), while Civil Engineering is reduced down to 30%.

This fact introduces the most promising possibility to realize effective savings in low-head projects of small powered outputs, as proposed in this invention.

Then, it is an aim of the present invention to promote the introduction of the siphon-type hydrostation layout; first patented by Robert L. Corbiere (U.S. Pat. No. 2,783,392, Feb. 26th, 1957) but not commercialized within the United States.

This layout, does not require expensive and cumbersome gated structures for water admission control, with involved subsequent pressurized actuating devices; then being lighter and cheaper to install.

Another aim of the present invention points to the introduction of the capsule-mounted generator set (Bulb set) as a standardized component. Up today, maintenance of these machines presents several drawbacks, which are compounded when the bulb is small and does not permit the approaching of maintenance crews.

Our self-commanded hydrostation concept; instead, being movable in itself, and thence transportable, permits the quick removal of the sets from their embodiments juxtaposing the fixed portion of the siphon conduit, for purposes of overhauling.

This fact permits, also, the standardized introduction of geared speed increasers drives between the slow speed turbine runner and the more standardized high rotational generator; which can be placed either within a bulb (P. Huguenin system); or externally from the water conduit either coaxially (G. Kühne system), or angulably (J. Haëfele system). The intermediate geared drive, permits the manufacture of a standardized range of generators, so spreading development costs between a large number of units and adding to the economics of small hydro.

Another further aim of the present invention, concerns with the overspeed transient rotational performance of the generator, after a full load rejection and tripping of the unit from the dead electrical network.

Normally speaking, standard generators as those available for Diesel plants, are not readily usable for service in hydroelectric plants as they are not designed to withstand turbine runaway speeds.

Into the Self-Commanded concept, instead, the unit is fitted with double overspeed protection: one electronic and one mechanical.

Upon a full electric load rejection and tripping of the unit from the network, the motive turbine runner is almost instantly disengaged from the motorizing fluidic flows circulation path, in a matter of seconds, so avoiding overspeed performances.

This is realized by inducing a downwardly directed pull on the assembly body and movable branch of the siphon layout, by air exhaustion from hermetic chambers following the actuation of said electronic and mechanical overspeed detection devices; and according to the teachings defined within U.S. Pat. No. 4,078,388. (Transportable Hydromotive Assembly: Mar. 14th, 1978).

Hermetic chambers are normally filled with pressurized gas or compressed air during start up and normal operation; but following loss of the electrical load and/or overspeed, compressed gas or air is suddenly exhausted from the hermetic chambers with consequent fluid introduction which induces said downwardly directed pull, disengaging so both fixed and movable branches of the siphon layout, with consequent breaking-off the fluidic flow circulation path.

An alternative design could be provided, into which; said fluidic circulation would not break, but be functionally transformed from a motive-one into a spilling-one, following a relief operation mode with spilling flows discharging along the remaining fixed portion of the siphon conduit, over the crest of the dam. To said purpose, the intake open end of the fixed conduit having said siphon layout, must be engineered below the upstream water level.

Alternatively, another embodiment could be introduced too, to secure against the overspeed transient performances; as a gated means, substantially surrounding the generators capsule when a bulb generator is fitted, and thence being substántially cylindrically shaped; said gated means being displaced to close the intake open end of the hydroelectric set and same of the movable conduit branch, following the downwardly displacement of same.

This stops the fluidic circulation through the turbine runner.

The relief operation mode has the advantage that fluidic dynamics are not disrupted within navigable canals or waterways, because of suction waves and surge phenomena upstream of the hydromotorized dams which could endanger the navigation procedures; thence permitting the fully hydromotorization of these dams, including when transient electric tripping of the networks are involved. Once this electric service is restored; then, an upwardly directed pull is induced within the hydroelectric set and movable conduit branch, with simultaneous opening of the concerned gate, when provided; and the turbine runner starts to direct the electric generator which is suitably synchronized to the network for actuation thereof. This is realized by pressurized air admission within the concerned hermetic chambers.

With this verticalized layout, substantial space is saved following the horizontal plan and no costly and cumbersome gated means are required to control the unit against the overspeed regimes. The optional relief operation mode is included when desired; and the movable conduit branch could be combined with the fixed damming arrangement following the teachings involved within the U.S. Pat. No. 4,143,990. (Dam with Movable Hydroelectric Station, Mar. 13th, 1979).

A further aim of the present invention, is associated with costs savings because the elimination of concrete structures, which are not required. This is so, because no powerhouse, nor cranage means would be both be required with this layout; and substantial savings would be realized in financial charges because said sets being almost instantly placed in situ, after leaving factories.

Concrete structures, at the most, would be limited to a simple slab realized in the upstream dam side at the bottom of the reservoir, in combination with the rocky supporting structure.

In the following Figures, the bulb type layout (P. Huguenin system), is described. However other layouts could be introduced.

Thence, it will be obvious to those skilled in the art, that the teachings of the present invention are free of the specific location of the turbine generator set, which could be placed horizontally within the siphon-like conduit in the uppermost portion of same and following the P. Huguenin system. (Swiss Patent No. 172,467, Jan. 2nd, 1935); or could be engineered with the associated generator outside same conduit either coaxially with same in the G. Kühne disposition, or following a right angulated disposition accordingly to the J. Haëfele system.

Relating now to the Figures, a preferred and practical embodiment of the invention is shown in the accompanying drawings, in which:

FIG. No. 1 is a schematic representation of a self-commanded hydrostation assembly comprising a longitudinal-vertical cross section through the structural body incorporating the turbine generator set, and being both ascending-descending branches of the siphon conduit layout combined between them, as seen along line 1—1 of the FIG. No. 2.

FIG. No. 2 represents a horizontal transversal cross section taken along the turbine runner plan, and along the line 2—2 shown in FIG. No. 1.

FIG. No. 3 shows, a detailed portion of an embodiment of the FIG. No. 1.

Figure 4:
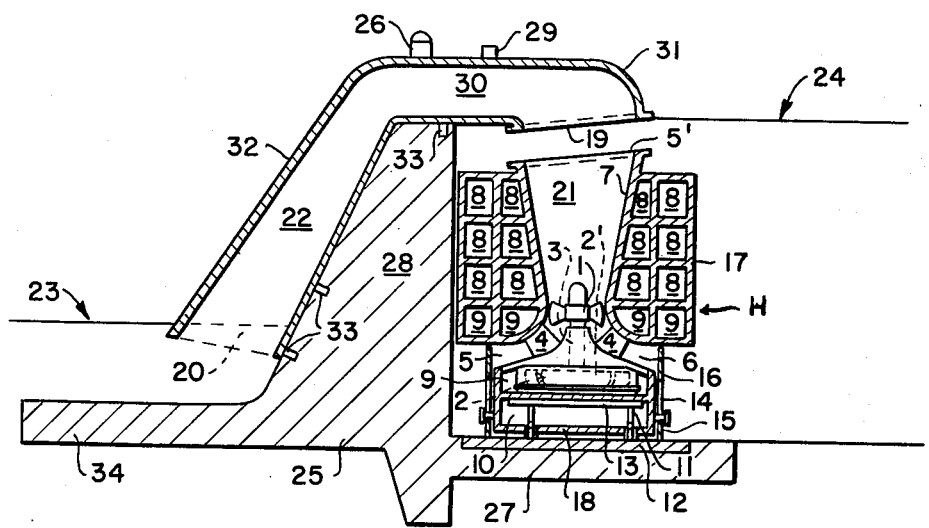

FIG. 4 is a view similar to FIG. 1 illustrating the alternate position of the hydromotive assembly.

Similar reference characters designate corresponding parts throughout the several Figures of the drawings.

Referring now to the drawings, the self-commanded hydrostation concept of the present invention would be seen to include an energy generation set comprising: a turbine runner 1 driving the rotor 2' of the electric generator 2 (having the stator 2") at one end axially adjacent a connecting shaft body 3; which, alternatively, could be replaced by an intermediate geared speed increaser drive, designed to allow at the combination of a low rotational turbine 1 with a higher speed rotational generator 2.

A distributor 4, generally having fixed gates, is included in the upstream portion of the conduit relatively the turbine runner 1, said turbine runner could be optionally being engineered with movable blades to be adjusted while being not in operation, either by a hand operated screw, or by a remotely actuated device operated by an electric motor. Both, generator set 2, turbine runner 1 and connecting driving device 3 may be considered to be an unitary sub-assembly hermetically enclosed within the capsule 6.

A substantially embodying fluidic flow circulation path surrounds the upper portion of the generator capsule 6, and fully the turbine runner 1, and forms a conduit defined by a wall 7.

Said conduit is determined following a siphon-like layout having: a substantially verticalized ascending branch 21 defined by said wall 7; a substantially horizontalized branch, or bend conduit branch 30, defined by wall 31 and being of the fixed type; and a substantially descending branch 22 defined by the wall 32 and being also of the fixed type. Ascending movable branch 21 is bounded at one first intake open end by a relatively large intake 5 combined with trashrack and stoplogs devices, and at the other outlet open end by a relatively small outlet 5', being of the draft type or energy recovery diffuser type between the turbine cross area and the outlet open end area 5'; the conduit wall 7 is surrounded by a plurality of hermetic chambers 8, 9, and 10; serving respectively as buoyancy compartments, chambers for machinery utilization, and self-commanding chambers; all them being in turn embodied by the peripheral wall 17 which forms the self-commanded movable hydroelectric set, having a bottom wall 18; in all following a disposition partly disclosed within U.S. Pat. No. 4,117,676. "Incorporable Hydromotive Assembly." Oct. 3rd, 1978, (FIG. No. 5).

In our arrangement, the hydromotive set is shown to be positioned for utilization at a point immediately upstream of the main structural body of the dam 28.

Said dam body 28 in turn, is suitably disposed atop the underlying support slab 25 to which are appended the upstream slab 27 and the downstream slab 34 acting as a stilling basin.

Said movable set and ascending branch 21, is functionally combined with the fixed branches of the siphon layout conduit 30-22, suitably affixed to the dam body 28 by clamping means 33, said fixed branches being bounded at one first open end by an intake 19 and at the other open end by an outlet 20 having a larger outlet cross area, and forming a diffuser or draft tube conduit which completes the energy recovery action realized along the movable portion 21 of the ascending branch.

A vacuum pump 26 and a relief exhausting valve 29 are suitably, optionally, disposed in functional combination with the upper wall 31 of the bend, or horizontalized branch 30 of the siphon layout, to aid in priming the siphon conduit when a fluidic flow must be started to be induced therethrough by actuation on said vacuum pump 26; or, alternatively, to stop said fluidic displacement by air admission through said valve 29. The priming sequence is feasible too, when first open end 19 is disposed at a lower level than the fluid reservoir level 24, and a priming device (not shown) is disposed within the descending branch 22 while water is allowed to run into the horizontalized branch 30; which, for this purpose, must have his bottom wall at a lower level than the lake water level 24. This arrangement is well known in actual technologies.

The outlet open end 20 must be placed at a lower level than same defined by tailwater body 23.

Motorizing flows producing actuation on turbine runner 1, are conveyed following the annular path defined between wall 6 of the upper side of the generator capsule, and wall 7 of the peripheric side of the conduit. The turbine runner 1, having movable blades and a fixed distributor 4, permits to adjust at most efficient performances following the variations of the hydraulic heads.

When a vacuum pump 26 and a relief valve 29 are disposed, the starting and stopping procedures could be realized without mobilizing the ascending branch 21 of the hydromotive assembly set body 17.

A more relatively instantaneous stopping procedure, and also starting procedure when flows are spilling through fixed branches 30- 22 are realized; by mobilizing said branch 21 either downwardly to stop the set; or upwardly to start same.

The downwardly displacment disengages open ends 5' and 19 of the fixed and movable branches, so bypassing motive flows away from the ascending branch 21 and into the open end 19 of the fixed conduit in a spilling operative procedure. In this position, the turbine runner 1 runs idle and under a controlled rotational regime, including when being disengaged from the electric network.

However, if a more effective controlled performance is required; then, a gated arrangement of simple design could be arranged. In the FIG. No. 1 said gate is shown having a substantially cylindrical shaped arrangement, embodying the generator capsule 6 or chamber 9 containing it, and defined by the body 16 in turn connected by members 14 to a base 12 acting as a ballasting body; while a trashrack structure 15 is cylindrically disposed around said members 14 to avoid foreign matters to be clogged between the hydromotive set bottom 18 and structure 12. When body set 17 moves downwardly, cylindrical gate 16 is directed to close the intake 5 of the hydromotive set, restricting same open end, and forcing the motive flows to bypass the conduit 21 while entering the open end 19 of the fixed siphon layout 30- 22.

A functional transformation is realized, by means of which, a motorized sequence is changed into a spilling procedure, and in a very nearly instantaneous procedure.

Base 12 is secured against slab 27, by suitable means; when the hydromotive set 17 is removed away the dam body 28, said base is detached also away said secured position.

In another verticalized disposition not shown in the Figures; the inlet open end would be engineered at the site of the base 18 and the downwardly displacement would automatically close same inlet 5 against the base 12; so avoiding the gate 16 with concerned movable members 16 and 14 and the involved trashrack structure 15 which is dispensed-off.

Although both upwardly and downwardly induced displacements will be realized by introducing gas or fluid, respectively, into the concerned hermetic chambers 8; a further engineered improvement could be introduced by means of the self-commanding concept.

Figure 3:
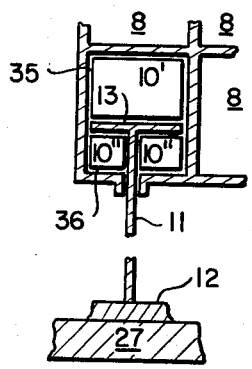

It consist of, at least one, piston-like member 13 embodied within a self-commanding chamber 10 and connected to the ballasting base 12 by suitable rods 11, as shown in the FIG. No. 1, in the general layout; and in a more detailed approach on FIG. 3.

When compressed air is admitted into the upper portion of the chamber 10, which is represented as 10' in FIG. No. 3; then, said piston member 13 is forced to act downwardly within same chamber, but because being fixed above base 12, thence, the entire set body 17 will be forced upwardly along a self-commanded displacement until the open end 5' of the ascending branch 21 is suitable functionally combined with the open intake end 19 of the fixed branch of the siphon layout.

This sequence, permits the engagement of spilling fluidic flows; once again, into the hydromotive procedure mode by including them therein the conduit 21 and following a controlled starting sequence of the turbine runner 1, which drives the generator rotor 2' along a steady rotational increased acceleration regime; so as to be synchronized to the restored electrical network, by automatic devices.

Because contacting of open ends 5' and 19 is realized at the end of the upwardly defined displacement, at one extreme fixed position; thence, no impacts would be introduced within the fixed open end 19 structures and related conduits.

In another verticalized disposition, the reversed procedure is directed when said pressurized gas or air is exhausted away the chamber 10 and its upper portion 10', while fluid is admitted on the lower portion 10" of same and the piston member is displaced upwardly within chamber 10, and accordingly, the entire hydromotive set 17 is moved down, so disengaging the two open ends 19 and 5'.

Now, the extreme lowest position, permits disengagement of the hydromotive assembly without impacting same against the bottom base 12 when contacting its own base 18, which is prevented to be forced in an uncontrolled displacement. This permits a very steady disengaging procedure although realized in a very short time.

Within the FIG. No. 3, commanding chamber 10 is defined into an upper portion 10' and a lower one 10". An embodyied member 13 acting as a piston, is connected to the base 12 by rods 11 as already said. An inflatable elastic bag 35 could be introduced within upper portion 10' when a reliable performance is desired.

Another hermetic inflatable bag is realized in the lower portion 10" of same chamber, when means are not provided to retain the base 12 against the bottom 18 when the set 17 is removed away from the slab 27 supporting structure. Both elastic bags could be dispensed-off however, if a true hermetic status is secured within the commanding chamber 10.

It is understood that the set 17 including the ballasting base 12 is entirely removable from the dam juxtaposition. For this purpose, the volumetric displacement of chambers 8 is defined to secure said mobility. Once disengaged away, the verticalized position of the set 17 could be reversed following a 180° rotation, so exposing the base 18 above the fluidic body 24 for maintenance procedures on generator 2.

This allows at the development of small hydro, without realizing costly cofferdammed structures to adapt them at existing dams.

An alternative embodiment, not disclosed in the Figures; is realized when the siphon layout is disposed structurally disposed combinably over a gate belonging to a low-head dam spillway. Here, the self-commanding effect is realized over all the siphon circuit including the gate; and mostly by introducing air or gas within chambers 8. While the gate is slightly raised, spilling water passing below depress the tailwater level 23 and the outlet open end 20 is exposed to the atmospheric pressure, disrupting fluidic flows therethrough the siphon conduit: 21/30/22.

This arrangement, is feasible when suitable gated arrangements are availables on spillways having its sills fully submerged by downstream tailwater levels.

These Self-Commanded sets could be arranged individually in single embodiments; or in a combination of a plurality of sets suitably combined into a single displaceable structure; or into a plurality of same thereof.

It will be understood that improvements or modifications may be introduced in the embodiments described by way of example without departing from the scope of the invention defined in the following claims:

I claim:

1. A hydrostation installation including, a main dam fluid retaining body, a siphon-type conduit system for conveying a fluid flow from one side to the other side of said dam body, a controllably movable hydromotive assembly disposed adjacent said dam body, said assembly including a movable ascending conduit branch forming a portion of said conduit system, said ascending branch provided with a lowermost intake open end and uppermost outlet open end, said assembly having an energy generation set provided with at least one component disposed within said ascending branch and adapted to be actuated as a fluid flow is directed therethrough, said conduit system including an additional conduit fixed relative said dam body and having a descending branch provided with an outlet open end and joined to a bend branch having an intake open end vertically aligned with said movable ascending branch outlet open end.

2. A hydrostation installation according to claim 1 including, means selectively operable to controllably displace said hydromotive assembly and said ascending branch outlet open end into functional combination with and separation from said bend branch intake open end.

3. A hydrostation installation according to claim 2 wherein, operation of said displacement means shifts said hydromotive assembly between two alternate positions comprising an uppermost one with said ascending branch outlet open end juxtaposed said bend branch intake open end to allow fluid flow through all said siphon conduit system and another lowermost position with said ascending branch outlet open end fully removed from said bend branch intake open end.

4. A hydrostation installation according to claim 3 including, a plurality of hermetic chambers in said hydromotive assembly to provide said displacement thereof between said two alternate positions and said chambers adapted to be filled with gas to yield an upward displacement of said assembly and alternately with fluid to yield a downward displacement of said assembly.

5. A hydrostation installation according to claim 3 wherein, said displacement means includes at least one hermetic chamber in said hydromotive assembly, a displaceable member within said chamber whereby, admission of gas into the upper portion of said chamber relatively shifts said member toward the bottom of said chamber as said assembly assumes said uppermost position and exhaustion of said gas with admission of fluid into the lower portion of said chamber relatively displaces said assembly to said lowermost position.

6. A hydrostation installation according to claim 5 wherein, said displacement means is regulated to preclude the application of structural stresses to said fixed conduit when said hydromotive assembly is displaced to said uppermost position and to preclude the application of structural stresses to said hydromotive assembly when displaced into said lowermost position.

7. A hydrostation installation according to claim 5 including, a fixed base beneath said hydromotive assembly, connecting means extending from said base and into said chamber and said displaceable member joined to said connecting means.

8. A hydrostation installation according to claim 3 wherein, upon displacement of said hydromotive assembly into said lowermost position the majority of fluid flow enters laterally and externally of said hydromotive assembly into said bend branch intake open end.

9. A hydrostation installation according to claim 3 including, gated means adjacent said hydromotive assembly, and said gated means substantially closing said ascending branch intake open end when said assembly is displaced to said lowermost position and opening said ascending branch intake open end when said assembly is displaced to said uppermost position.

10. A hydrostation installation according to claim 9 wherein, said displacement means includes at least one hermetic chamber in said hydromotive assembly and a displaceable member within said chamber.

* * * * *